Jan. 27, 1948. W. F. STANTON Re. 22,968

FUEL MIXTURE CONTROL

Original Filed Jan. 20, 1933

INVENTOR
WARREN F. STANTON
GLADYS PERRY STANTON
ADMINISTRATRIX

BY George R. Ericson
ATTORNEY

Reissued Jan. 27, 1948

Re. 22,968

UNITED STATES PATENT OFFICE 22,968

FUEL MIXTURE CONTROL

Warren F. Stanton, deceased, late of Pawtucket, R. I., by Gladys Perry Stanton, administratrix, Pawtucket, R. I.; said Warren F. Stanton assignor, by mesne assignments, to American Car and Foundry Investment Corporation, New York, N. Y., a corporation of Delaware Original No. 2,408,104, dated September 24, 1946, Serial No. 652,731, January 20, 1933. Application for reissue April 16, 1947, Serial No. 741,833

33 Claims. (Cl. 123—119)

This invention relates to the subject of pending application No. 600,038, filed March 19, 1932, now Patent No. 2,348,033. In the invention of that application, means are provided for regulating the richness of the mixture supplied to an internal combustion engine through control of air admission, or the action of the choke valve, utilizing intake manifold pressure to act upon said choke valve through the medium of a diaphragm, and being subject to the mixture temperature through a thermostat. This means is also used for providing throttle opening while starting, or when the engine starts to stall. The arrangement was such that immediately the diaphragm starts to move under suction, the choke valve opens and the throttle starts to close.

It has been found extremely desirable, especially with a choke valve offset so as to tend to open by suction, and when starting a cold engine, to allow a slight flutter of the choke valve while cranking, that is to say, a slight opening of the valve on the suction stroke followed by closing of the valve on the compression stroke, thus admitting the slight amount of air necessary to provide a firing mixture, and doing away with the necessity of providing a bleeder or auxiliary air valve. This flutter should take place without corresponding opening and closing of the throttle valve. It has been found desirable to make a sharp distinction between the amount which the choke valve opens under the cranking vacuum, and the amount which it opens under the firing vacuum. In the present invention means are provided for procuring the desired flutter without disturbing the throttle opening, and for sharply defining the amount of choke opening under cranking vacuum.

It has been found desirable a connection between the diaphragm and the choke valve which is yielding for a portion of its action and positive through the remainder. This allows the thermostat, when in its cold position, to exert still more resistance to the opening of the choke valve and thus provide a richer mixture when the engine is cold. This also permits the use of a lower powered, and hence cheaper, thermostat to give the desired control. If a high powered thermostat is used, it may be sufficiently strong to prevent the desired choke valve flutter when the engine is cold. Yielding means is provided between the thermostat and the choke valve which will allow this desired flutter or opening regardless of the strength of the thermostat.

The invention is not restricted to an embodiment which will contain all or any number of the features or the devices before mentioned and hereinafter to be described, but the invention is to be understood as consisting in whatever is described by or is included within the terms or scope or legal meaning of the appended claims.

Referring to the drawing which for the purpose of clarity of illustration is somewhat diagrammatical;

Figures 1, 2, 3:
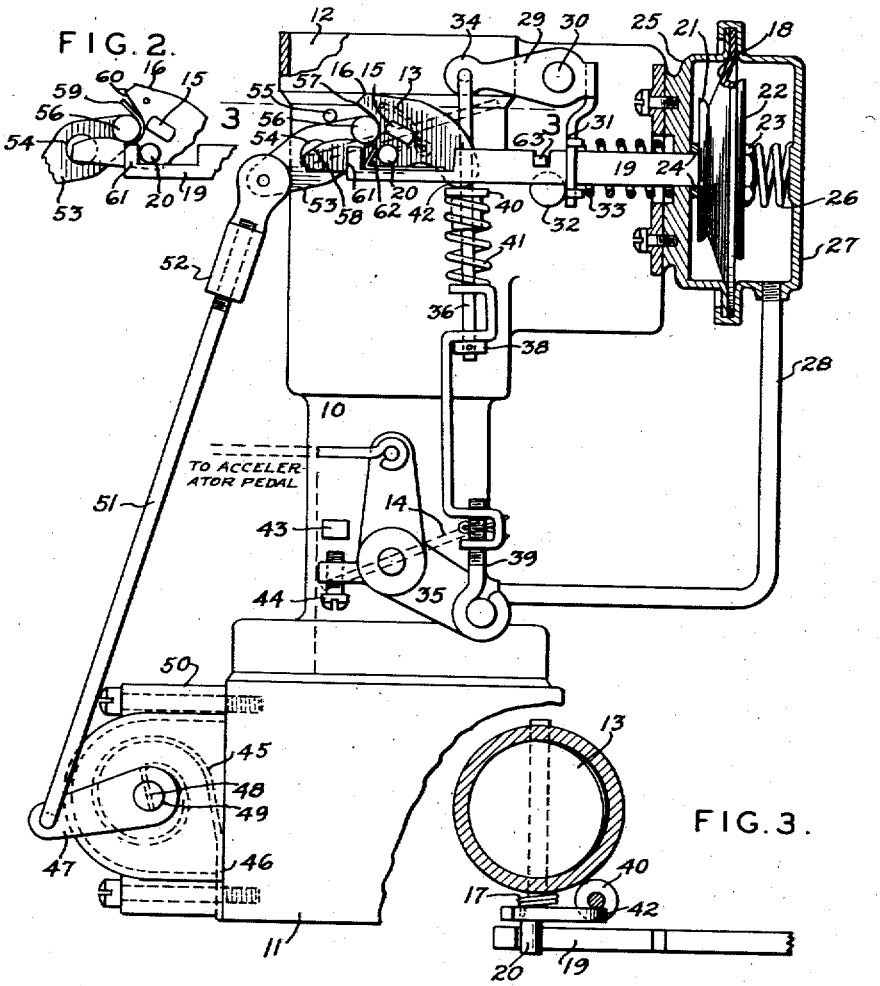
Fig. 1 is an elevation of the carbureter portion of an internal combustion engine embodying the invention.
Fig. 2 is a detail view of the choke lever, diaphragm rod and thermostat lever of a different construction from what is shown in Fig. 1.
Fig. 3 is a detail view, in horizontal section, on the line 3—3, Fig. 1.

The invention is illustrated as applied to a carbureter 10, of the so-called "down-draft" type, and which is bolted to the intake manifold 11, from which the mixture flows to the engine. Air enters the carbureter through port 12, the amount of air supplied being controlled by the choke valve 13, which is shown of the balanced butterfly type. It may, however, be of any type. The supply of mixture from the carbureter to the engine is controlled by the throttle valve 14, which is manually operated in the usual manner. Fuel is fed to the carbureter from a float chamber through jets in the ordinary manner. As the method of feeding fuel forms no part of the invention, the float chamber and jets are not illustrated.

The choke valve 13 is fastened to a shaft 15 to the squared end of which is fastened the choke lever 16. The valve is normally held closed by coil spring 17, one end of which is fastened to lever 16, and the other end to the carbureter body. Choke valve 13 is opened by, and according to the degree of engine suction, by motion of an engine vacuum actuated diaphragm 18, transmitted by diaphragm rod 19, to a pin 20, fixed on lever 16. The diaphragm is held on rod 19 by flanges 21 and 22, nut 23 and collar 24, the latter serving as a limit stop by abutting the adjacent end wall 25, of the diaphragm chamber when the diaphragm is moved to that position by spring 26, when there is no engine vacuum. The diaphragm is tightly clamped at its outer rim at a point between wall 25, and the opposite end wall 27, and the space between the latter and the diaphragm is connected by pipe 28, with the carbureter or intake manifold on the engine side of the throttle, so that the vacuum acting on diaphragm 18, is that existing in the intake manifold.

A lever 29 is pivoted on stud 30, fast in body 10, and has an arm 31, which encircles rod 19, which arm is held against stop pin 32, by spring 33. The other arm 34, of lever 29, has a slip joint connection with throttle arm 35. This is formed by rod 36, which is longitudinally slidable in holes in one end of link 37, and provided with a stop collar 38, and an adjustable connection between rod 37, and throttle arm 35, that is a threaded rod 39, screwed into the other end of link 37. With this slip joint connection, it is apparent that rotation of lever 29 in a clockwise direction can move arm 35, to open the throttle 14, but the throttle is free to open or close beyond this position without affecting lever 29.

Rod 36, has slidably mounted upon it flanged sleeve 40, held by spring 41, against the end of arm 42, of choke lever 16, spring 41 being of such length that with choke valve 13, closed and throttle 14, slightly opened, sleeve 40 will approximately touch arm 42. The length and strength of spring 41, are varied to suit different carbureters. Throttle lever 35 is provided with the customary stop 43 and stop screw 44.

For controlling the position of choke valve 13, according to mixture temperature, a thermostat 45 is provided, which is preferably of the bi-metal coil spring type, although the invention is not limited to this type and which has been shown with the outer end 46, in intimate contact with the intake manifold casting so that the position of the thermostat arm 47, reflects the temperature of the mixture. However, the thermostat can be located at any desired place. The other inner end 48, of the thermostat coil is fastened to shaft 49, to which is fastened arm 47, and the thermostat coil is so arranged that heating it causes arm 47 to move in a clockwise direction. Thermostat 45 is preferably shrouded with a cover 50 which in this case has been designed to provide also a support for the shaft 49, and a means for clamping the thermostat to the intake manifold. Arm 47 is connected by rod 51, and adjustable connection 52 with lever 53, pivoted on stud 54. A stop pin 55 limits movement of lever 53 in a counter-clockwise direction. A pin 56, on lever 53 coacts with jaw face 57 of lever 16, to provide a yielding stop against opening movement of choke valve 13, when the thermostat is cold, the position of pin 56, and hence the degree of resistance to opening, depending on the temperature of the thermostat. When the thermostat becomes hot, pin 56 coacts with jaw face 58, of lever 16, and forms a positive stop against the closing of choke valve 13.

To allow more original opening of choke valve 13, when arm 53 is in its cold position, a yielding connection may be provided between pin 56 and lever 16, as in Fig. 2, where spring 59 fastened to lever 16, gives a yielding connection with pin 56, for the first opening movement of lever 16, and by abutting against face 60, then gives a positive connection.

A positive connection may be used between rod 19, and lever 16, as shown in Fig. 2, where jaw 61, directly abuts pin 20, or a yielding connection as shown in Fig. 1, where spring 62, fastened to rod 19, co-acts with pin 20, jaw 61 in this case furnishing a positive stop to movement of spring 62.

As hereinbefore described, rod 19 is free to slide in arm 31 of lever 29, but continued movement of the rod to the right under action of intake suction and against the pressure of spring 26, causes lug 63 on rod 19 to engage arm 31, so that further movement to the right of rod 19, moves lever 29 in counter-clockwise direction, and also brings spring 33 into combination with spring 26, to resist movement of rod 19.

The operation of the mechanism is as follows:

The throttle stop screw 44, is adjusted with relation to stop 43, to give the desired idling speed when the engine is hot, and connection 39 is adjusted so that when lever arm 31 abuts stop pin 32, the throttle is open considerably more than at normal idling speed. Assume the engine stopped and cold, then lever 53 is held against stop 55 by thermostat 45. As there is no vacuum in the manifold, rod 19 is held by spring 26 in its extreme left position with collar 24 abutting against chamber wall 25, choke valve 13 is held shut, and spring 33 holds arms 31 against stop 32, and thus, by rod 36, collar 38, link 37 and connection 39, holds throttle 14 slightly open, all as illustrated in Fig. 1.

The engine is cranked, thus causing a low vacuum in the intake manifold and communicated through pipe 28, to the diaphragm chamber to actuate diaphragm 18. This low vacuum is enough to overcome the resistance of spring 26, moving rod 19 to the right until lug 63 engages lever arm 31, when movement of rod 19 stops, as the cranking vacuum is not enough to overcome the resistance of spring 33. This movement of rod 19 to the right tends through spring 62 and pin 20, to move lever 16, counter-clockwise, thus opening the choke, and as there is a slight amount of play between pin 56 and jaw face 57, a slight opening is obtained before thermostat lever 53 begins to offer resistance. At cranking speed, the movement of diaphragm 18 will tend to be intermittent, due to the alternate suction and compression strokes of the engine pistons, hence choke valve 13 will have a slight flutter. When the engine is very cold the thermostat holds lever 53 hard against its stop pin 55, and pin 56 offers so much resistance to movement of lever 16, that spring 62 compresses, and the choke opens but slightly. If the engine is warmer, however, lever 53 offers less resistance to movement of arm 16, and spring 62 either does not compress at all, or but slightly, thus giving a greater choke opening for cranking when the engine is warm than when it is very cold. Thus, regulation is provided of the cranking opening of the choke valve by the degree of opposition between thermostat lever 53 and spring 62. A similar result is obtained, but in a different manner by what is shown in Fig. 2, where rod 19 positively acts on lever 16 through lug 61 and pin 20. The amount of choke opening is thus dependent on the opposition between lever 53 and spring 59. In this case, the amount of movement of rod 19 to the right is dependent on the action of spring 59 and arm 53.

Immediately the engine starts firing, the firing vacuum (which is much greater than the starting vacuum) is enough to overcome the resistance of spring 33, and rod 19 moves still farther to the right, thus opening the choke still more, the amount of opening depending upon the degree of vacuum and the resistance which the thermostat offers through arm 53 and pin 56 to the movement of lever 16, this resistance being greater the colder the engine. If the engine is warm at starting, the thermostat offers but little resistance, and if it is at its normal running temperature, the thermostat has rotated lever 53 sufficiently in clockwise direction that the choke valve is positively held wide open.

The overcoming of the resistance of spring 33 by movement of rod 19, farther to the right, by the firing vacuum causes lug 63, to rotate lever 29 counter-clockwise, thus allowing throttle 14 to close toward its normal idling position, the degree of closure depending on the temperature through the resistance offered by thermostat arm 53. Thus the idling speed with a cold engine will be greater than that with a warm or hot engine.

When the throttle is operated manually to vary the engine speed, opening the throttle causes the vacuum to drop. This allows the choke valve to close, which action may give too rich a mixture. However, as the throttle is opened, sleeve 40 is pushed by spring 41, against arm 42 on lever 16, tending to open the choke, thus overcoming the effect due to the vacuum drop. This opening being resisted by thermostat arm 53, it will be seen that a proper running mixture is attained through the cooperation of intake manifold pressure, engine temperature and throttle opening, and none of these elements can be left out of consideration and still have a proper mixture.

If the engine while idling either hot or cold tends to stall, the vacuum immediately drops to a degree where diaphragm 18 is unable to overcome the resistance of spring 33, which immediately rotates lever 29 clockwise, thus opening the throttle valve and preventing stalling.

The claims are:

1. Fuel control means for engines comprising a fuel conditioning device for delivering the conditioned fuel to the engine, two valves associated with said device in the line of flow of fuel-forming elements to and through said device, automatic valve-moving means subject to intake pressure at a point beyond said device for causing fuel conditioning movement of said valves, a yielding connection between such means and one of said valves to permit a lag in its initial movement, and temperature responsive means acting to modify the action of said valve-moving means.

2. Fuel control means as in claim 1 for an internal combustion engine in which the conditioning device is a carbureter and the valves are, respectively, throttle and choke valves.

3. Fuel control means as in claim 1 for an internal combustion engine in which the conditioning device is a carbureter and the valves are respectively, throttle and choke valves, and having manual throttle-opening means and the degree of choke being affected by opening the throttle thereby.

4. Fuel control means as in claim 1 for an internal combustion engine in which the conditioning device is a carbureter and the valves are, respectively, throttle and choke valves, and the throttle valve is manually operable and an operative connection between throttle and choke valves.

5. Fuel control means as in claim 1 for an internal combustion engine in which the conditioning device is a carbureter and the valves are, respectively, throttle and choke valves, and the throttle valve is manually operable, and an operative connection between throttle and choke valves, said connection being yieldable in the direction to transmit motion from the throttle valve to the choke valve.

6. Fuel control means for internal combustion engines comprising a carbureter, a choke valve, a throttle valve, valve-moving means for both valves subject to intake manifold pressure and movable in one direction thereby, and a plurality of successively acting yieldable resistances to movement of said valve-moving means.

7. Fuel control means for internal combustion engines comprising a carbureter, a choke valve, a throttle valve, valve-moving means subject to intake manifold pressure and movable in one direction thereby, said movement first opening the choke valve and then closing the throttle valve while the opening of the choke valve continues.

8. Fuel control means as in claim 7 in which comparatively low resistance is opposed to primary opening of the choke valve and a substantially higher resistance is opposed to the closing of the throttle valve and further movement of the choke valve.

9. Fuel control means as in claim 6 having temperature responsive means acting to modify action of the valve-moving means.

10. Fuel control means as in claim 6 having temperature responsive means acting to modify action of the valve-moving means and having manual throttle opening means, the degree of choke being affected when the throttle is opened.

11. Fuel control means for an internal combustion engine comprising a carbureter having a choke valve means operatively connected with the choke valve and situated to be actuated by the engine vacuum when cranking and when firing that varies the amount of opening of the choke valve according to the vacuum in the respective cases, the opening being slight under cranking vacuum, the valve being free to flutter during cranking, a throttle valve, an operative connection between choke valve and the throttle valve that permits fluttering movement of the choke valve independently of the throttle valve, and an operative connection between said vacuum actuated means and the throttle valve.

12. In an internal combustion engine, a carbureter, a suction operable choke valve for said carbureter, means acting in addition to the suction applied directly to said choke and operated by said engine for controlling said choke valve, said operating means tending to close said choke valve when said engine is operating at 100 R. P. M. or less and said means tending to open said choke valve when said engine is operating at speeds substantially above 100 R. P. M., and temperature controlled means for limiting the movement of said control means.

13. Fuel control means for an internal combustion engine comprising a carbureter for delivering conditioned fuel to the engine, throttle and choke valves associated with said carbureter in the line of flow of fuel-forming elements to and through said carbureter, automatic valve-moving means subject to intake pressure at a point beyond said carbureter for causing fuel conditioning movement of said valves, a yielding connection between such means and one of said valves to permit a lag in the initial movement of said valve, and temperature responsive means acting to modify the action of the valve-moving means.

14. Fuel control means for an internal combustion engine comprising a carbureter for delivering conditioned fuel to the engine throttle and choke valves associated with said carbureter in the line of flow of fuel forming elements to and through said carbureter, manual throttle opening means associated with said carbureter, the degree of choke being affected by opening the throttle thereby, automatic valve-moving means subject to intake pressure at a point beyond said carbureter for causing fuel conditioning movement of said valves, a yielding connection between such means and one of said valves to permit a lag in the initial movement of said valve, and temperature responsive means acting to modify the action of said valve-moving means.

15. Fuel control means for an internal combustion engine comprising a carburetor for delivering conditioned fuel to the engine, a choke valve and a manually operable throttle valve associated with said carburetor in the line of flow of fuel-forming elements to and through said carbureter, an operative connection between the throttle and choke valves, automatic valve-moving means subject to intake pressure at a point beyond said carbureter for causing fuel conditioning movement of said valves, a yielding connection between such means and one of said valves, and temperature responsive means acting to modify the action of said valve-moving means.

16. Fuel control means for an internal combustion engine comprising a carbureter for delivering conditioned fuel to the engine, a choke valve and a manually operable throttle valve associated with said carbureter in the line of flow of fuel-forming elements to and through said carbureter, an operative connection between the throttle and choke valves, said connection being yieldable in the direction to transmit motion from the throttle valve to the choke valve automatic valve-moving means subject to intake pressure at a point beyond said carbureter for causing fuel conditioning movement of said valves, a yielding connection between such means and one of said valves, and temperature responsive means acting to modify the action of said valve-moving means.

17. In an internal combustion engine having an intake manifold, a carbureter, a choke valve, means for opening said choke valve when the temperature is high, means for closing the choke valve when the temperature is low, a suction actuating element responsive to pulsations of the motor being cranked when the choke valve is in position, resilient means connecting said suction responsive element to said choke valve for setting up a fluttering action during cranking, a throttle valve, means for holding said throttle valve in partial open position at low vacuum, and means for varying the low vacuum position of said throttle in accordance with temperature.

18. The substance of claim 17 characterized in that the low vacuum position of the throttle is independent of the fluttering movement.

19. In a carbureter for attachment to an intake manifold of an internal combustion engine, a throttle valve, a choke valve, said choke valve having its position determined by the position of the throttle as the throttle valve is moved from its closed position, means for holding said throttle valve in partially opened position at low vacuum, and means for varying and maintaining said choke position dependent upon said throttle position as controlled by temperature and vacuum.

20. In an internal combustion engine having an intake manifold, a carbureter, a choke valve, means for opening said choke valve when the temperature is high, means for closing said choke valve when the temperature is low, a suction actuated element responsive to pulsations of the motor being cranked with the choke valve in closed position, and resilient means connecting said suction responsive element to said choke valve for setting up a fluttering action during cranking.

21. In an internal combustion engine having an intake manifold, a carbureter, a choke valve, means for opening said choke valve when the temperature is high, means for holding said choke valve in closed position when the temperature is low, a suction actuated element responsive to suction variations in said manifold, spring means for retaining said suction responsive element in its inoperative position, resilient means opposing said spring means, a resilient connection between said suction actuated element and said choke valve, said choke valve being fully responsive to said suction actuated member upon normal vacuum conditions when the temperature is high in the manifold and independent of said resilient connection, and means for opening said throttle beyond fast idle position for cold starting.

22. The substance of claim 21 characterized in that means are provided for positively opening said choke valve upon a drop in manifold vacuum due to movement of said throttle to open position.

23. The substance of claim 21 characterized in that means are provided for opening the choke upon a drop in vacuum due to movement in said throttle to an open position, said choke position being determined by temperature.

24. In a carbureter, a choke valve, a heat responsive device for controlling the choke valve, a suction responsive element operatively connected with said choke valve for setting up a fluttering action when the motor is cranked with the choke valve in closed position, said fluttering action being independent of the action of the heat responsive device.

25. In a carbureter, a choke valve, a heat responsive device for controlling the choke valve, a suction responsive element resiliently connected with said choke valve for setting up a fluttering action when the motor is cranked with the choke valve in closed position, said fluttering action being independent of the action of the heat responsive device.

26. In a carbureter, a choke valve, a throttle valve, a heat responsive device for controlling the choke valve, an operative connection between the choke valve and the throttle valve, a heat responsive device for controlling the choke valve, a suction responsive element operatively connected with said choke valve for setting up a fluttering movement of the choke valve when the motor is cranked with the choke valve in closed position and independent of said heat responsive device and an operative connection between said vacuum actuated means and the throttle valve.

27. In a carburetor for attachment to an intake manifold of an internal combustion engine, a throttle valve, a choke valve, the position of which is determined by the position of the throttle, means for holding said throttle valve in partially open position at low vacuum, and means controlled by temperature and vacuum for varying said choke position, said vacuum controlled means being initially ineffective to operate said choke.

28. In a carburetor for attachment to an intake manifold of an internal combustion engine, a throttle valve, the position of which is controlled by temperature, a choke valve, the position of which is determined by the position of the throttle, means for holding said throttle valve in partially open position at low vacuum, and means controlled by temperature and vacuum for varying said choke position.

29. In an internal combustion engine, a choke valve movable towards open position by suction, a choke shaft for mounting said choke valve, and spring means for preventing initial opening movement of said choke valve by suction during cold starting, said spring means engaging a member fixed to said shaft.

30. In an internal combustion engine, an induction conduit, a choke valve movable towards open position by suction means, and operating means between said choke valve and suction means including a clutch, said clutch being inoperative during the initial movement of said suction means.

31. The combination in an internal combustion engine carburetor having an air inlet and a mixture outlet controlled by a throttle valve: a choke valve controlling the air inlet and openable by a differential of pressure on opposite sides thereof; means responsive to temperature and suction for controlling the choke valve; and yielding means adapted to urge the choke valve toward open position whenever said valve is at least partially closed, said yielding means being effective when the throttle valve is open at least beyond the idling position.

32. In a carburetor for an internal combustion engine having an air inlet controlled by a suction responsive choke valve and a mixture outlet controlled by a throttle: temperature responsive means for closing the choke valve when said means is cold; and yielding means so constructed and arranged as to exert a force in a choke valve opening direction at all such times as the choke valve is within a range of movement from the closed to a predetermined partly open position and the throttle is open beyond the idling position.

33. The combination in an internal combustion engine carburetor having an air inlet and a mixture outlet controlled by a throttle valve: a choke valve controlling the air inlet; means responsive to temperature and suction for controlling the choke valve; and yielding means adapted to urge the choke valve toward open position whenever said valve is at least partially closed, said yielding means being effective when the throttle valve is open at least beyond the idling position.

GLADYS PERRY STANTON,
*Administratrix of the Estate of Warren F. Stanton, Deceased.*